June 17, 1924.
L. A. YOUNG
SPRING STRUCTURE
Filed June 5, 1922
1,497,967
2 Sheets-Sheet 1
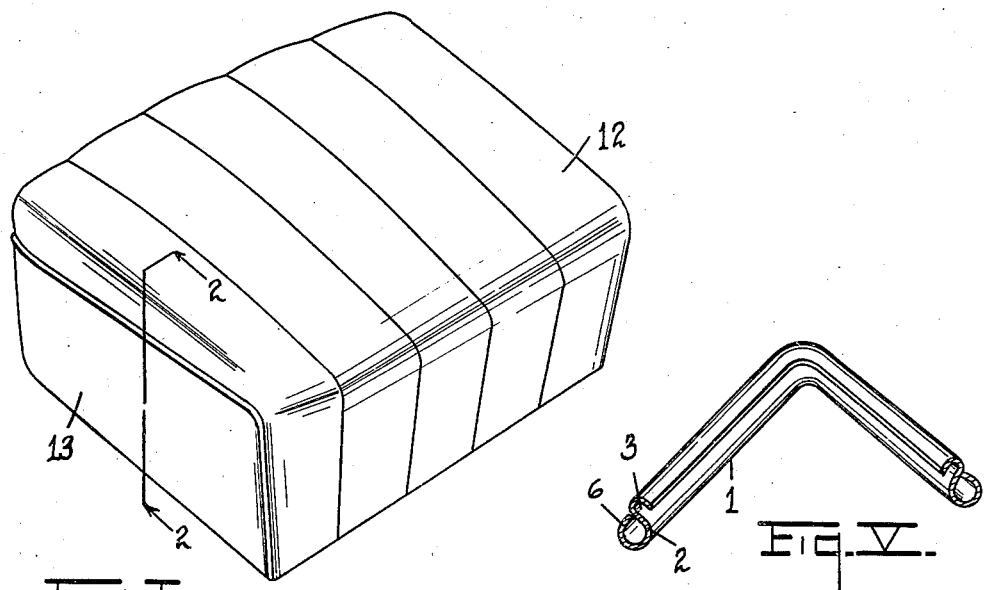
Fig. I.
Fig. V.
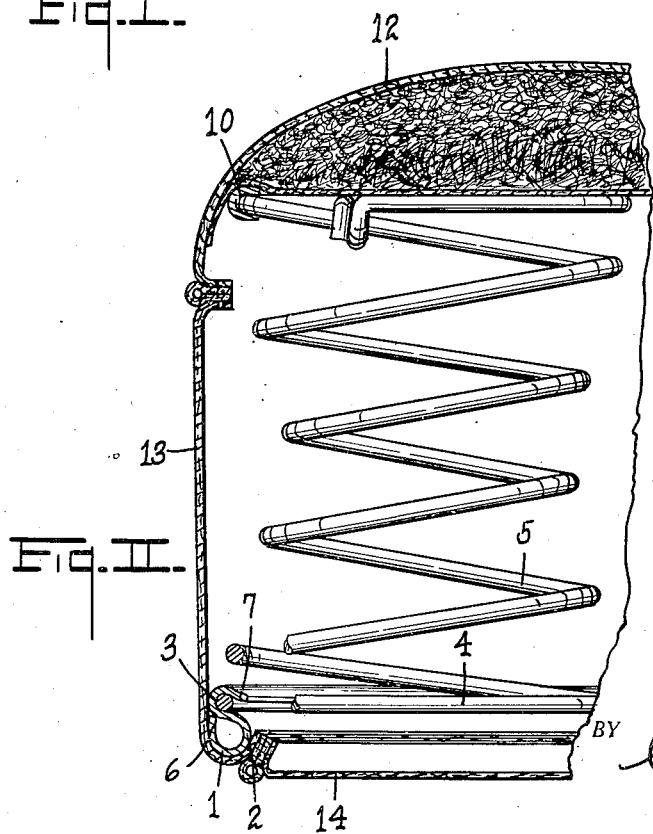
Fig. II.
INVENTOR.
Leonard A. Young
BY
ATTORNEYS

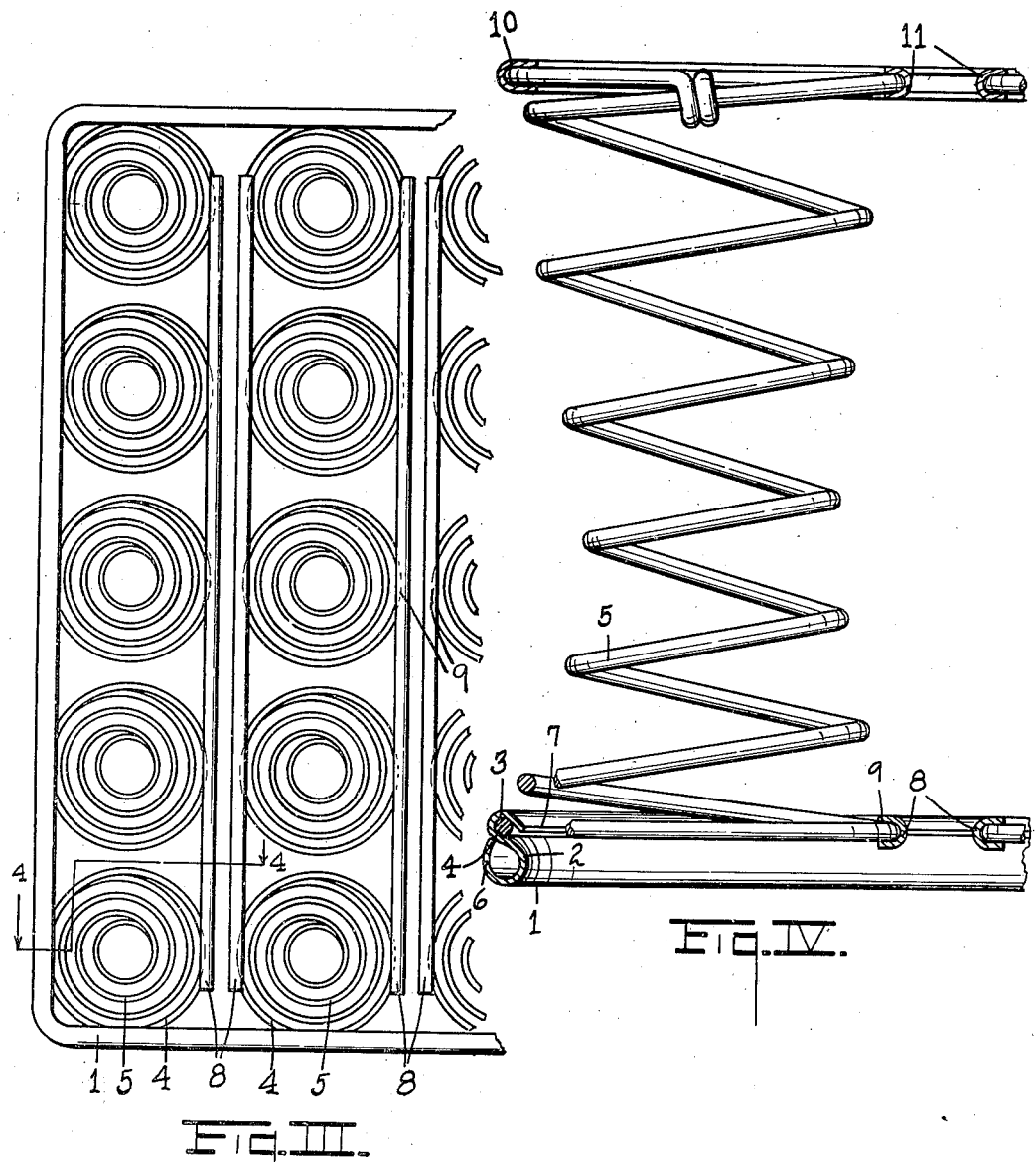

Patented June 17, 1924.

1,497,967

UNITED STATES PATENT OFFICE.

LEONARD A. YOUNG, OF BLOOMFIELD TOWNSHIP, OAKLAND COUNTY, MICHIGAN, ASSIGNOR TO L. A. YOUNG INDUSTRIES, INCORPORATED, OF DETROIT, MICHIGAN.

SPRING STRUCTURE.

Application filed June 5, 1922. Serial No. 565,843.

*To all whom it may concern:*

Be it known that I, LEONARD A. YOUNG, a citizen of the United States, residing at Bloomfield Township, county of Oakland, State of Michigan, have invented certain new and useful Improvements in Spring Structures, of which the following is a specification.

This invention relates to improvements in spring structures.

The objects of this invention are:

First, to provide a spring structure adapted for automobile cushions and the like which may be made of comparatively light material, and, at the same time, one which is not likely to get out of shape in use or handling in the factory or assembling the parts.

Second, to provide an improved cushion spring comprising a bottom border frame which facilitates the assembling of the upholstery and effectively supports the same with a minimum of strain and wear thereon.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a perspective view of an automobile seat cushion embodying the features of my invention.

Fig. II is a detail vertical section on a line corresponding to line 2—2 of Fig. I.

Fig. III is a fragmentary bottom view before the upholstering is applied.

Fig. IV is an enlarged detail vertical section on a line corresponding to line 4—4 of Fig. III showing structural details.

Fig. V is a fragmentary perspective view of the bottom border frame.

In the drawing the sectional views are taken looking in the direction of the little arrows at the ends of the section lines and similar numerals of reference refer to similar parts throughout the several views.

Referring to the drawing, the cushion illustrated is a single seat, or half automobile cushion, as they are frequently called. I desire to point out at this point that my improvements are particularly desirable for use in the "full" automobile seat cushions as there is greater need for cushions having my improvements. However, as a matter of convenience the smaller cushion has been illustrated.

I provide a tubular border frame 1 formed of sheet metal, the inner portion 2 of the frame being curved upwardly and inwardly providing the inwardly facing channel 3 adapted to receive the bottom coils 4 of the body upholstery springs 5. The edge 6 of the outer portion of the frame member is disposed against the curved channel forming portion. This provides a very rigid frame, even when made of comparatively light material, a rounded outer surface being presented. The springs 5 are preferably arranged in rows as shown in Fig. III, the bottom coils of the outer springs being engaged in this channel which is clamped or indented at 7 over the bottom coils, thus firmly securing them to the frame.

The cross strips 8 are preferably of U-cross section as illustrated, the bottom coils of the rows of springs being connected thereby, and the strips being clamped upon the coils at 9. These cross strips are floating strips, that is, they are connected to the border frame only through the bottom coils of springs. This is of advantage in that it greatly simplifies manufacture, my improved frame being of sufficient rigidity that it does not require that the cross strips be directly secured thereto to provide bracing members; and, further, the cushion bottom may accommodate itself to the platform or seat on which the cushion is arranged, thereby relieving the cushion of strains to which it would otherwise be subjected.

In the structure illustrated, I provide an inwardly facing U-shaped top border frame 10 engaging the outer coils, and the cross strips 11 substantially the same as the cross strips for the bottom. The upholstering 12 is provided with a skirt or side portions 13, the lower edges of which are drawn around the bottom border frame, as shown in Fig. II, and secured to the cushion bottom 14. The skirt portion is effectively supported by the border frame, not only during the upholstering operations in which the upholstering is drawn tight around the frame, and any springing or yielding thereof is objectionable, but the frame presents a rounded surface of considerable dimensions so that it is easily drawn around the frame and the frame does not cut or unduly wear the upholstery.

The frame may be made of comparatively light material and at the same time is rigid and does not become distorted in shipment or handling or assembling the springs. It will be understood that it is the general practice for one manufacturer to construct the spring portion of the cushion. It is then shipped to the automobile manufacturer where the upholstering is applied. It is, of course, greatly to be desired that it shall reach the hands of the upholsterer in good condition. As pointed out, the structure facilitates the upholsterer's work, as well as providing a very desirable completed structure.

Having thus described my invention what I claim as new and desire to secure by Letters Patent is:

1. In a spring structure, the combination of a tubular bottom border frame of sheet metal having its inner portion curved upwardly and inwardly providing an inwardly facing channel, the edge of the outer portion of said frame being disposed against the said channel curve providing a round bottomed rigid frame, springs disposed in rows with the coils of the outer springs engaged in said border frame channel, an upholstery covering comprising a skirt portion disposed with its lower edge around said border frame, and a bottom secured to the skirt portion of said upholstering within said frame.

2. In a spring structure, the combination of a tubular bottom border frame of sheet metal having its inner portion curved upwardly and inwardly, providing an inwardly facing channel, the edge of the outer portion of said frame being disposed against the said channel curve providing a round bottomed rigid frame, springs disposed in rows with the coils of the outer springs engaged in said border frame channel, and an upholstery covering comprising a skirt portion embracing said border frame.

In witness whereof, I have hereunto set my hand and seal.

LEONARD A. YOUNG. [L. S.]